United States Patent [19]

Collin et al.

[11] Patent Number: 5,340,556

[45] Date of Patent: Aug. 23, 1994

[54] CERIUM/LANTHANUM/TERBIUM MIXED PHOSPHATES

[75] Inventors: Marie-Pierre Collin, Epinay sur Seine; Denis Huguenin, Levallois; Anne-Marie Le Govic, Paris, all of France

[73] Assignee: Rhone-Poulenc Chimie, Courbevoie Cedex, France

[21] Appl. No.: 831,057

[22] Filed: Feb. 4, 1992

[30] Foreign Application Priority Data

Feb. 4, 1991 [FR] France ................. 91 01215

[51] Int. Cl.$^5$ .................... C09K 11/08; C01F 17/00
[52] U.S. Cl. ................... 423/263; 252/301.4 P
[58] Field of Search ................. 252/301.4 P; 423/263

[56] References Cited

U.S. PATENT DOCUMENTS

| | | |
|---|---|---|
| 3,507,804 | 2/1970 | Ropp . |
| 5,091,110 | 2/1992 | Fan et al. ............... 252/301.4 P |
| 5,116,532 | 5/1992 | Chau et al. ............ 252/301.4 P |
| 5,132,042 | 7/1992 | Chau et al. ............ 252/301.4 P |

FOREIGN PATENT DOCUMENTS 9199200 10/1986 European Pat. Off. .
2124243 2/1984 United Kingdom .

OTHER PUBLICATIONS

Patent Abstracts of Japan, vol. 6, No. 94 (C-105) (972), Jun. 2, 1982; & JP-A-5723674, (Nichia Denshi Kagaku K.K.).

Patent Abstracts of Japan, vol. 12, No. 82, Mar. 15, 1988; & JP-A-62218477, (Mitsubishi Electric Corp) Sep. 25, 1987.

Patent Abstracts of Japan, vol. 9, No. 233, Sep. 19, 1985; & JP-A-6090287 (Mitsubishi Denki K.K.) May 21, 1985.

*Primary Examiner*—Wayne Langel
*Attorney, Agent, or Firm*—Burns, Doane, Swecker & Mathis

[57] ABSTRACT

Novel cerium/lanthanum/terbium (LaCeTb) mixed phosphates, especially useful in luminescence for the production of green phosphors, have the formula (I):

$$La_xCe_yTb_{1-x-y}PO_4$$

in which x ranges from 0.4 to 0.6 and x+y is greater than 0.8, display a lightness (L*) of greater than 98% after calcination at a temperature above 700° C. in air, and the cerium (IV) and/or terbium (IV) contents of which are very low, even after calcination in air at a temperature above 500° C.

14 Claims, 1 Drawing Sheet

CERIUM/LANTHANUM/TERBIUM MIXED PHOSPHATES

BACKGROUND OF THE INVENTION

1. Field of the Invention

The present invention relates to rare earth (RE) mixed phosphates especially useful for the production of phosphor materials, and, more particularly to cerium lanthanum terbium mixed phosphates especially useful as green phosphor precursors, as well as to a process for the production of such precursors.

2. Description of the Prior Art

Since 1970 it has been known to this art that rare earth mixed phosphates and especially those of cerium, lanthanum and terbium exhibit an advantageous luminescence property. Thus, numerous cerium lanthanum terbium phosphates, also designated "LaCeTb phosphates" have been developed with different concentrations of lanthanum, cerium and terbium, as have various processes for the production thereof.

Such processes for the production thereof can be divided into two basic categories, namely, processes which entail a "dry route", and processes which entail a "wet route".

The dry-route processes, described especially in JP 62/007,785, WO 82/04,438, JP 62/089,790, JP 59/179,578 and JP 62/000,579 include forming a mixture of rare earth oxides or phosphating a rare earth mixed oxide by calcination in the presence of diammonium phosphate.

The "wet-route" processes, described especially in JP 57/023,674, JP 60/090,287 and JP 62/218,477, entail a direct synthesis of a rare earth mixed phosphate or of a mixture of rare earth phosphates by digestion of a solid compound (carbonate, oxide) with $H_3PO_4$ to precipitate the phosphates.

U.S. Pat. No. 3,507,804 describes a process for the production of lanthanum terbium double phosphate by precipitating the phosphate from a solution of rare earth nitrates and adding phosphoric acid thereto. However, the phosphate or phosphates obtained are very difficult to filter.

These different processes produce mixed phosphates requiring, for their application in luminescence, a heat treatment at a high temperature, approximately 1,200° C., under a reducing atmosphere. Indeed, in order that the LaCeTb phosphate provide a green phosphor, the cerium and the terbium must be in the 3+ oxidation state.

In addition, the efficiency of the phosphatation must be close to 100% in order to obtain a phosphor which is as pure as possible and to obtain a maximum emission efficiency, and this requires numerous precautions and a relatively long treatment in the case of the "dry-route" processes.

SUMMARY OF THE INVENTION

Accordingly, a major object of the present invention is the provision of improved rare earth (cerium, lanthanum, terbium) mixed phosphates which can be converted into green phosphor by calcination at high temperature and under a nonreducing atmosphere, together with an improved process for the production of such mixed phosphates by a wet route resulting in a rare earth mixed phosphate of high purity and which improved process avoids or conspicuously ameliorates the above disadvantages and drawbacks to date characterizing the state of this art.

Briefly, the present invention features cerium lanthanum terbium mixed phosphates having the general formula:

$$La_xCe_yTb_{1-x-y}PO_4 \quad (I)$$

in which $y+x$ is greater than 0.8, and x ranges from 0.4 to 0.6.

BRIEF DESCRIPTION OF THE DRAWING

The Figure of Drawing is an X-ray diffraction spectrum of a novel cerium/lanthanum/terbium mixed phosphate according to the present invention.

DETAILED DESCRIPTION OF THE PREFERRED EMBODIMENTS OF THE INVENTION

Figure 1:
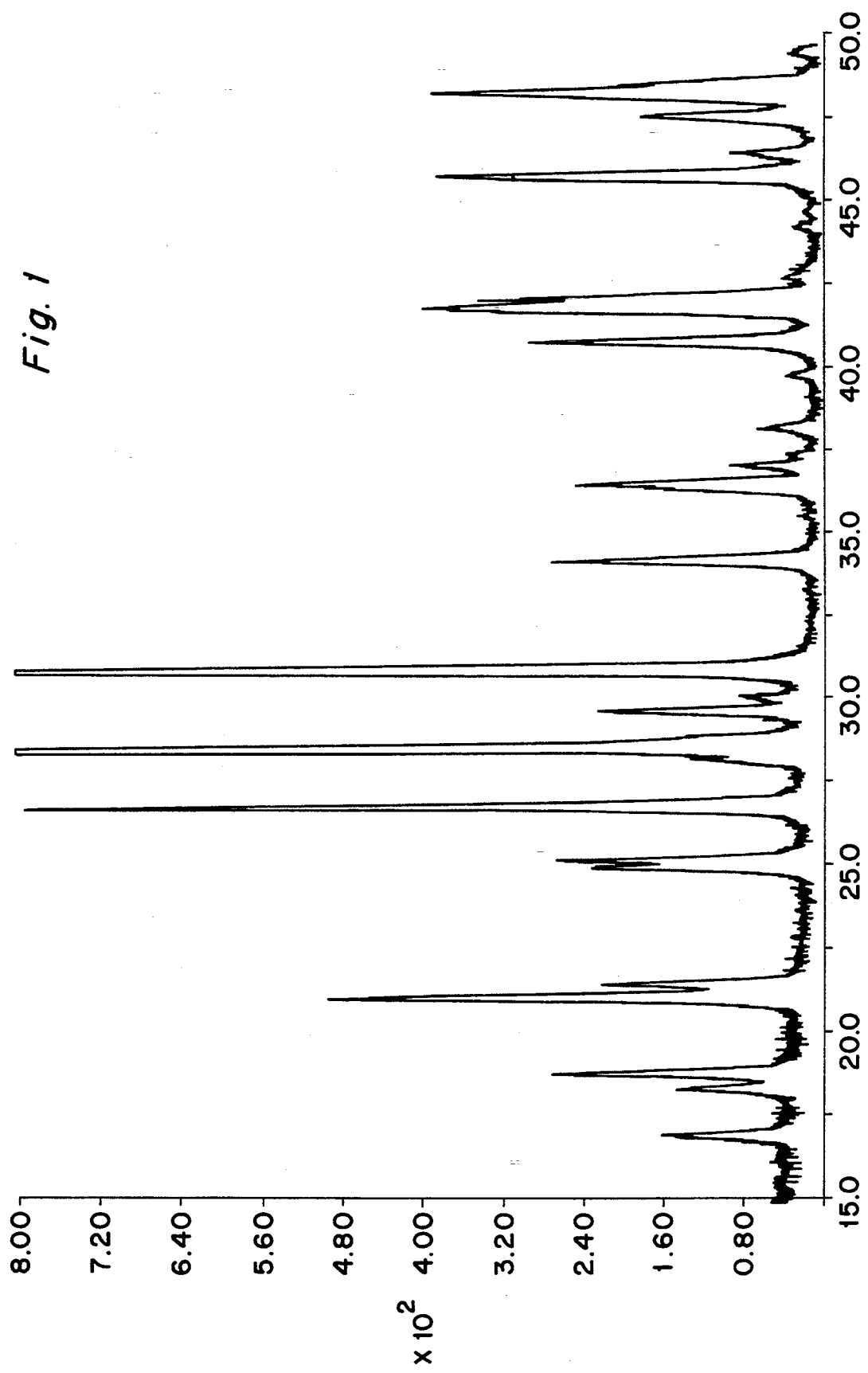

More particularly according to the present invention, the subject phosphates are characterized in that they exhibit a cerium (IV) and terbium (IV) concentration which is very low after calcination at a temperature above 500° C. in air.

Such low proportion is demonstrated by a colorimetric test that includes determining the characteristic coordinates of the color of the substance in the CIE 1976 system (L*, a*, b*) as defined by the International Commission on Illumination, and listed in the French Standards (AFNOR) compendium colorimetric color No. X08–012 (1983). These coordinates are determined using a colorimeter marketed by the Pacific Scientific Company.

Thus, after calcination at 700° C. in air, the LaCeTb phosphates of the invention exhibit a lightness, denoted by the L* coordinate, higher than 98% and advantageously ranging from 99% to 99.9%.

This L* coordinate makes it possible to measure the white color of the product, which is directly related to the presence of colored species in the product, such as cerium and/or terbium in the 4+ oxidation state.

The phosphates of the invention also exhibit a* and b* color coordinates ranging from approximately −0.5 to 0.5, preferably from −0.25 to 0.50.

These excellent values of lightness L*, a* and b* are also obtained employing calcination temperatures ranging from 700° to 900° C. This reflects an exceptional stability of the compounds of the invention in a nonreducing atmosphere.

The presence or absence of cerium and/or of terbium in the 4+ oxidation state can also be assessed by a surface analysis of the phosphates by the XPS technique described especially in Praline et al, *Journal of Electron Spectroscopy and Related Phenomena*, 21, pp. 17 to 30 and 31 to 46 (1980).

Thus, in the energy range corresponding to the 3d electrons of cerium, the phosphates of the invention exhibit two doublets characteristics of the 3+ oxidation state and the absence of a satellite situated at 32.7 V from the first peak, characteristic of a 4+ oxidation state.

The mixed phosphates of the invention have cerium and terbium atoms which are stabilized in the 3+ oxidation state, permitting any atmosphere whatever to be employed during the calcination. As the cerium and the terbium are in the 3+ state, the mixed phosphates of the invention make it possible to produce green phosphors having a high luminescence property.

Furthermore, the present invention also features cerium lanthanum terbium mixed phosphates of general formula (I) described above, containing, before calcination at a temperature above 500° C., not more than 5% by weight of ammonium ions, advantageously less than 2%.

These ammonium ions are removed by thermal decomposition or evaporation during the calcination of the product.

The mixed phosphates of the invention exhibit a specific surface area greater than 50 m²/g after heat treatment at a temperature below 300° C.

This specific surface area, measured by the so-called B.E.T. method, which is determined by nitrogen adsorption in accordance with ASTM standard D3663-78 established from the Brunauer-Emmett-Teller method described in *The Journal of the American Chemical Society*, 60, 309 (1938), advantageously ranges from 50 m²/g to 100 m²/g.

The mixed phosphates of the invention may also contain additives, such as other rare earths or metallic elements.

This invention also features a process for the preparation of the cerium lanthanum terbium mixed phosphates described above.

This process comprises mixing a solution of soluble lanthanum, cerium and terbium salts with phosphate ions and controlling the pH of the precipitation medium at a pH value higher than or equal to 2, then filtering off and washing the precipitate and optionally drying it to provide a mixed phosphate of general formula (I) which may contain absorbed ammonium groups. This mixed phosphate may then be calcined at a temperature above 500° C. and under any atmosphere whatever to provide the compound of general formula (I).

According to the invention, the precipitate is maintained in the precipitation medium, after completion of the mixing, for a period of time ranging from approximately 15 min to approximately 10 hours, when the pH of the precipitation medium ranges from approximately 2 to 6. This aging period, typically designated "maturation", permits a rearrangement of the precipitated species. The product obtained is thus filterable.

Although the precipitate obtained when the pH of the precipitation medium is controlled at a value above 6 is filterable, this filterability can be improved by a maturation of the precipitate equivalent to that used when the pH of the precipitation medium ranges from 2 to 6.

This maturation stage can be carried out at any temperature whatever, for example at a temperature ranging from 15° C. to 100° C., advantageously at the precipitation temperature, preferably with stirring. The pH of the medium may be controlled or may be allowed to change freely.

By "controlled pH" is intended a period of maintaining the pH at a certain value by addition of basic or acidic compounds or of a buffer solution. The pH of the medium will thus vary by approximately one pH unit around the fixed target value.

In the present invention, this pH control is advantageously effected by the addition of a basic compound, as more fully described below.

The filtered product may be especially dried by processes employing spraying and drying of the droplets, such as an atomization technique. It is thus possible to produce a product which has particles of a mean diameter which advantageously ranges from approximately 1 $\mu$m to 10 $\mu$m with a narrow particle size distribution.

Thus, the process for the preparation of mixed phosphates according to the invention permits the calcination of this product to be carried out under any atmosphere, whether reducing or nonreducing, or even an oxidizing atmosphere. The calcined product obtained will contain cerium and terbium in the 3+ oxidation state, cerium and terbium in the 4+ oxidation state being present only in trace amounts, or being completely absent.

The solution of lanthanum, terbium and cerium salts may contain other metal salts such as, for example, salts of other rare earths, to provide LaCeTb phosphates doped with other elements.

The control of the pH of the precipitation medium may be carried out by the addition of a compound during the mixing of the solution of the rare earth ions and of the phosphate compound. This compound is generally a basic compound.

Thus, if the phosphate is added to the rare earth solution, the basic compound is added simultaneously with the phosphate to control the pH at a value above 2.

Similarly, when the solution of rare earth compounds is added to a phosphate solution, the basic compound is added simultaneously to control the pH at a value which is higher than 2 and advantageously constant.

This control of the pH at a value above 2 and advantageously ranging from 2 to 10 makes it possible to obtain a nongelatinous and filterable precipitate of LaCeTb phosphate with or without a maturation stage, depending on the pH range.

The precipitation is preferably carried out in an aqueous medium at a temperature which is not critical and which advantageously ranges from room temperature (15° C.–25° C.) to 100° C.

The concentrations of the rare earth salts are not critical. Thus, the total rare earth concentration, expressed as rare earth oxide, advantageously ranges from 0.01 mol/l to 2 mol/l.

The rare earth salts which are suitable per the present invention are especially the salts which are soluble in an aqueous medium, such as, for example, nitrates, chlorides, acetates, carboxylates or a mixture thereof.

The phosphate ions mixed with the rare earth solution are contributed by pure or dissolved compounds such as, for example, phosphoric acid, alkali metal phosphates or those of other metallic elements which yield a soluble compound with the anions associated with the rare earths.

In a preferred embodiment of the invention, the phosphate ions are added in the form of ammonium phosphate because the ammonium cation will decompose during the calcination, thus enabling a mixed phosphate of high purity to be obtained.

Among the ammonium phosphates, diammonium or monoammonium phosphates are the preferred compounds of the invention.

The phosphate ions are added such as to provide a $PO_4 \equiv /RE$ molar ratio higher than 1 and advantageously ranging from 1.1 to 3.

Exemplary basic compounds which are suitable according to the invention include the metal hydroxides or ammonium hydroxide, or any other basic compound, the species of which will not form any precipitate upon being added to the reaction mixture by combining with one of the species present in this mixture, and permitting a control of the pH of the precipitation medium.

In another preferred embodiment of this invention, this basic compound is advantageously a compound which is easily removable either with the liquid phase of the reaction mixture and washing of the precipitate, or by thermal decomposition when the mixed phosphate is calcined.

Thus, the preferred basic compound of the invention is ammonia, advantageously in the form of an aqueous solution thereof.

The cerium lanthanum terbium mixed phosphates of the invention display luminescence after having been subjected to a heat treatment generally above 500° C. and advantageously from 700° C. to 1000° C.

However, such luminescence can be improved even further by a heat treatment employing "fluxes", these treatments being conventionally employed in the art for the production of phosphors.

They permit, inter alia, an adaptation of the phosphor to the intended use.

These phosphors based on LaCeTb phosphates are especially useful in lamps.

In order to further illustrate the present invention and the advantages thereof, the following specific examples are given, it being understood that same are intended only as illustrative and in nowise limitative.

EXAMPLE 1

To a solution of monoammonium phosphate heated to 80° C., a solution of rare earth nitrates was added, containing an overall 0.2 mol/l concentration of rare earths, and comprised of: 0.112 mol/l of La(NO$_3$)$_3$, 0.062 mol/l of Ce(NO$_3$)$_3$ and 0,026 mol/l of Tb(NO$_3$)$_3$.

The PO$_4$≡/RE molar ratio was 1.5. The pH during the precipitation was controlled at 2 by adding aqueous ammonia.

The reaction mixture was subjected to a maturation of 4 hours at 80° C.

The precipitate was then recovered by filtration and washing with water.

The recovered product was a white powder whose characteristics were as follows (after drying at 110° C.):

(a) X-ray spectrum (see Figure of Drawing),
(b) specific surface area: 65 m$^2$/g, measured at 200° C.,
(c) NH$_4^+$ ion content: 1% by weight The powder had the formula Za$_{0.56}$Ce$_{0.31}$Tb$_{0.13}$PO$_4$.

This powder was subjected to a heat treatment at 900° C. in air. X-ray analysis evidenced that the product was an LaCeTb orthophosphate of monoclinic crystalline structure. This product was compact aggregates of approximately 250 nm formed by the aggregation of elementary crystallites ranging from 20 to 150 nm in size.

EXAMPLE 2

A solution of diammonium phosphate was added to an aqueous solution containing 0.50 mol/l of rare earth nitrates to provide a PO$_4$≡/RE molar ratio of 1.5. This reaction was carried out at 25° C. The pH of the precipitation medium was controlled at 8.4 by adding aqueous ammonia.

After recovery of the precipitate, washing and drying, the product obtained exhibited physicochemical characteristics similar to those described in Example 1. The product calcined at 900° C. in air was evaluated for luminescence.

EXAMPLE 3

The procedure of Example 1 was repeated, but the solution of rare earth nitrates had a concentration of 2 mol/l.

The morphology of the product obtained was similar to that from Example 1 with crystallite sizes ranging from 80 to 200 nm.

Luminescence Test

The LaCeTb phosphates produced by the process of the invention were analyzed to determine their luminescence property.

The luminescence was determined by means of a "Bentham" ® spectrometer making it possible to obtain an emission spectrum of the specimen excited with a low-pressure mercury vapor lamp at a wavelength of 254 nm. The calculation of the integral of the intensities of emission between two wavelengths is designated "brightness."

These two wavelengths were 540 and 560 nm.

The results obtained after heat treatment of the LaCeTb phosphates of Examples 1 to 3 at a temperature of 900° C. for 8 hours are reported in the Table below:

TABLE

| EXAMPLE | 1 | 2 | 3 |
| --- | --- | --- | --- |
| Brightness (ua) | 111 | 122 | 147 |

Colorimetry Test

After calcination at 700° C. for 8 hours, the LaCeTb phosphate of Example 1 was tested in the colorimeter described above according to the procedure indicated in French AFNOR standard No. X08–012 of 1983.

The L*, a* and b* coordinates of the CIE system (L*, a*, b*) were determined and had the following values:
L* = 99.0%
a* = −0.1%
b* = −0.1%

With the same product calcined at 900° C. for 8 hours, the results were as follows:
L* = 99.4%
a* = −0.1%
b* = +0.4%

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a cerium lanthanum terbium mixed phosphate having the formula (I):

$$La_xCe_yTb_{1-x-y}PO_4 \qquad (I)$$

in which x ranges from 0.4 to 0.6 and x+y is greater than 0.8, and having a lightness (L*), measured by colorimetry, of greater than 98% after calcination at a temperature above 700° C. in air, the process comprising mixing a solution of soluble lanthanum, cerium and terbium salts with phosphate ions, while controlling the pH of such medium of precipitation at a value above 2, to thereby precipitate a mixed phosphate therefrom, maintaining the precipitate in the precipitation medium for a period of time ranging from 15 min to 10 hours after completion of the mixing when the value of the pH of precipitation ranges from 2 to 6, and then filtering off, washing, and optionally drying said precipitate.

2. The process as defined by claim 1, comprising controlling the pH of the medium of precipitation at a value above 6, and maintaining such pH of the precipitation medium for a period of time ranging from 15 min to 10 hours after completion of the mixing.

3. The process as defined by claim 1, comprising calcining the recovered precipitate at a temperature above 500° C.

4. The process as defined by claim 3, comprising conducting said calcination in a reducing atmosphere.

5. The process as defined by claim 3, comprising conducting said calcination in a nonreducing atmosphere.

6. The process as defined by claim 1, comprising controlling the pH of the precipitation medium by adding a basic compound thereto.

7. The process as defined by claim 6, comprising simultaneously adding the phosphate ions and the basic compound to the solution of the soluble rare earth salts.

8. The process as defined by claim 6, comprising adding the solution of soluble rare earth salts to the solution containing phosphate ions, and simultaneously adding the basic compound thereto.

9. The process as defined by claim 1, said phosphate ions comprising an ammonium phosphate solution.

10. The process as defined by claim 9, said ammonium phosphate comprising diammonium phosphate or monoammonium phosphate.

11. The process as defined by claim 1, said phosphate ions comprising phosphoric acid.

12. The process as defined by claim 6, said basic compound comprising an ammonium hydroxide.

13. The process as defined by claim 1, wherein the concentration of rare earths, expressed as rare earth oxide, in said solution ranges from 0.01 mol/l to 2 mol/l.

14. The process as defined by claim 1, said soluble rare earth salt comprising a rare earth nitrate, chloride, acetate or carboxylate.

* * * * *